United States Patent
Albiez et al.

(10) Patent No.: US 11,007,969 B2
(45) Date of Patent: May 18, 2021

(54) ONE-PIECE WOVEN AIRBAG

(71) Applicant: Global Safety Textiles GmbH, Maulburg (DE)

(72) Inventors: Daniel Albiez, Murg (DE); Michael Becker, Utzenfeld (DE)

(73) Assignee: GLOBAL SAFETY TEXTILES GMBH, Maulburg (DE)

( * ) Notice: Subject to any disclaimer, the term of this patent is extended or adjusted under 35 U.S.C. 154(b) by 0 days.

(21) Appl. No.: 16/550,558

(22) Filed: Aug. 26, 2019

(65) Prior Publication Data
US 2020/0101929 A1    Apr. 2, 2020

(30) Foreign Application Priority Data
Sep. 28, 2018  (DE) .................... 10 2018 124 099.6

(51) Int. Cl.
*B60R 21/235*    (2006.01)
*B60R 21/2338*   (2011.01)

(52) U.S. Cl.
CPC ........ *B60R 21/235* (2013.01); *B60R 21/2338* (2013.01); *B60R 2021/23509* (2013.01); *B60R 2021/23547* (2013.01)

(58) Field of Classification Search
CPC ... B60R 21/207; B60R 21/231; B60R 21/217; B60R 2021/2074; B60R 2021/23153; B60N 2/853; B60N 2/42727
See application file for complete search history.

(56) References Cited

U.S. PATENT DOCUMENTS

| | | | | |
|---|---|---|---|---|
| 5,865,465 A * | 2/1999 | Bauer | ............... | B60R 21/232 280/743.1 |
| 6,076,564 A * | 6/2000 | Bruggemann | ........ | D06H 7/20 139/413 |
| 8,622,424 B2 * | 1/2014 | Finn | ................ | D03D 1/02 280/743.2 |
| 9,663,062 B2 * | 5/2017 | Rohn | ............... | B60R 21/2338 |
| 2007/0040368 A1 * | 2/2007 | Manley | ............ | D03D 25/005 280/743.2 |
| 2007/0200329 A1 * | 8/2007 | Ma | .................. | B60R 21/235 280/743.1 |
| 2010/0173137 A1 * | 7/2010 | Kismir | ............... | D03D 15/00 428/196 |
| 2016/0002831 A1 * | 1/2016 | Becker | ............... | B60R 21/231 139/384 R |
| 2016/0264090 A1 * | 9/2016 | Wootton | ........... | B60R 21/2338 |
| 2016/0368448 A1 * | 12/2016 | Yoshida | ............ | B60R 21/232 |
| 2017/0130371 A1 * | 5/2017 | Harabayashi | ...... | D03D 1/02 |

FOREIGN PATENT DOCUMENTS

JP           2015016722 A  *  1/2015

* cited by examiner

*Primary Examiner* — Darlene P Condra
(74) *Attorney, Agent, or Firm* — Pearne & Gordon LLP

(57) ABSTRACT

The invention relates to a one-piece woven airbag, in particular for vehicle restraint systems, with an upper fabric and a lower fabric which are joined together in a single-ply seam area forming the border of the airbag, with tether threads which are woven partially into the upper fabric and partially into the lower fabric and float there between over a defined length, which is characterized by upper limiting threads which are woven into the upper fabric and/or lower limiting threads which are woven into the lower fabric, the limiting threads between upper fabric and lower fabric floating over a defined number of floating tether threads and being attached to attachment points of their fabric layer.

6 Claims, 4 Drawing Sheets

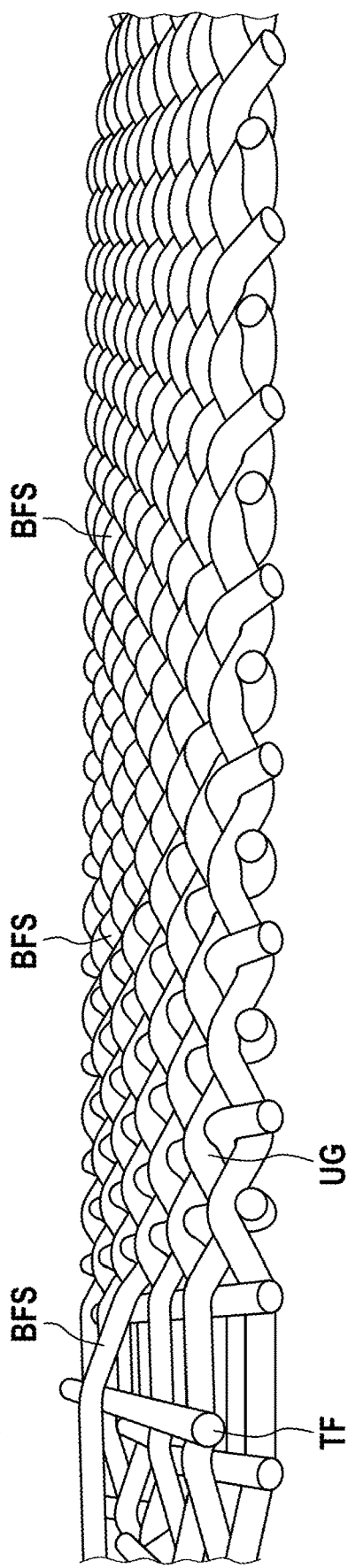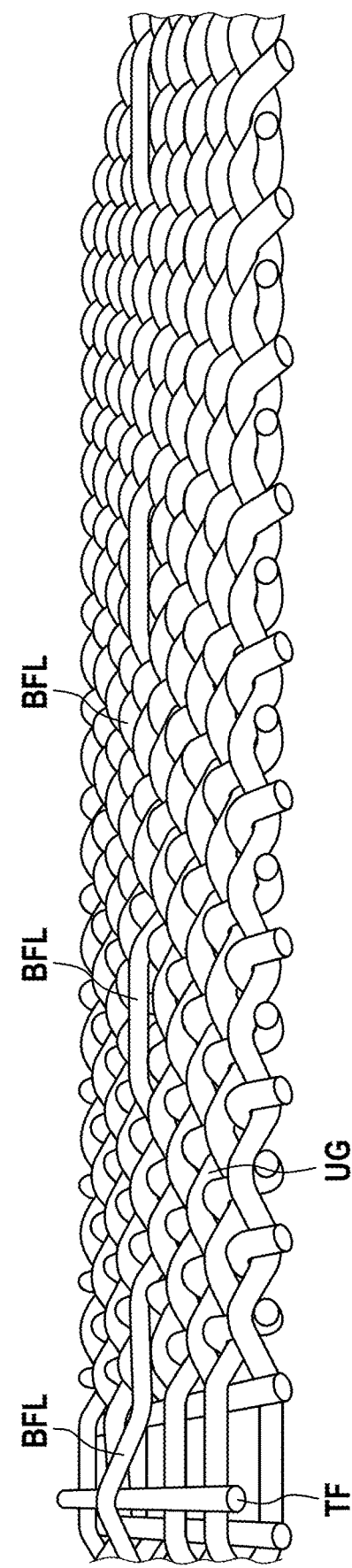

ONE-PIECE WOVEN AIRBAG

The present invention relates to a one-piece woven airbag, in particular for vehicle restraint systems, with an upper fabric and a lower fabric which are joined together in a single-ply seam region forming the border of the airbag, with tether threads which are woven partially into the upper fabric and partially into the lower fabric and float therebetween over a defined length.

DE 10 2010 032 016 A1 discloses an airbag with a one-piece rebound strap (also known as a "tether" in technical jargon) defining two inflation stages, a shorter part of a tether portion breaking when a predefined pressure is reached, whereupon the fabric layers move farther apart to allow the creation of a larger airbag volume. This is a very complex construction in which a plurality of individual parts are sewn together to form an airbag. In addition, the procedure is considered to be quite rough since tearing of a rebound strap subjects the airbag to a considerable jerk which can be very disruptive depending on the application.

Airbags are disclosed which have rebound straps configured as X-tethers. X-tethers have the disadvantage that, in the application, sudden filling of the airbag with a filling medium exerts high tensile forces on the yarns at the attachment points of the X-tether threads in the fabric. The consequence of this is that in a coated airbag the fabric may detach from the laminate at these points, the so-called stress points, and as a result leak points (pinholes) may arise which can lead to failure of the airbag. In the application, the entire airbag is inflated to its maximum volume. With this design, it is impossible or very difficult to achieve stepwise inflation in predefined regions.

The invention is based on the object of proposing an airbag in which the disadvantages known in prior art are avoided or at least greatly diminished.

The object is achieved with a one-piece woven airbag (OPW), in particular for OPW airbags in the area of vehicle restraint systems, with an upper fabric and a lower fabric which are joined together in a single-ply seam region forming the border of the airbag, with tether threads which are woven partially into the upper fabric and partially into the lower fabric and float therebetween over a defined length, which is characterised by upper limiting threads which are woven into the upper fabric and/or lower limiting threads which are woven into the lower fabric, the limiting threads between upper fabric and lower fabric floating over a defined number of floating tether threads and being fastened to attachment points of their fabric layer.

The solution according to the invention has the advantage that it is possible to effect controlled release of the airbag volume depending on the inflation pressure, thus preventing the formation of leak points (detachment of the laminate from the fabric) and associated bursting of the airbag at the stress points. Advantageously, targeted inflation of defined regions in the airbag is possible as a function of time and/or pressure as well as the generation of different pressure-dependent inflation heights.

In an advantageous embodiment of the invention, the limiting threads are woven into the upper fabric and/or lower fabric in each case less tightly than the threads which form the upper fabric and the lower fabric. The resulting advantage emerging is that the limiting threads can be pulled out of the fabric, particularly with predetermined integration, even with predetermined tensile loading.

In a further advantageous embodiment of the invention, the limiting threads are of a lower strength than the threads which form the upper fabric and the lower fabric. This has the advantage that predetermined limiting threads can be selected for a predetermined inflation situation of the airbag. The remaining airbag, or its threads, remain intact. No holes occur in the fabric.

To show how the invention can be embodied and for better understanding, it will now be briefly described by way of an example embodiment with reference to the drawing in which:

FIG. 6a is a perspective 3D illustration of a fabric layer with a limiting thread tightly woven in.

FIG. 6b is a perspective 3D illustration of a fabric layer with a limiting thread loosely woven in which floats in places over a plurality of threads.

Figure 1:
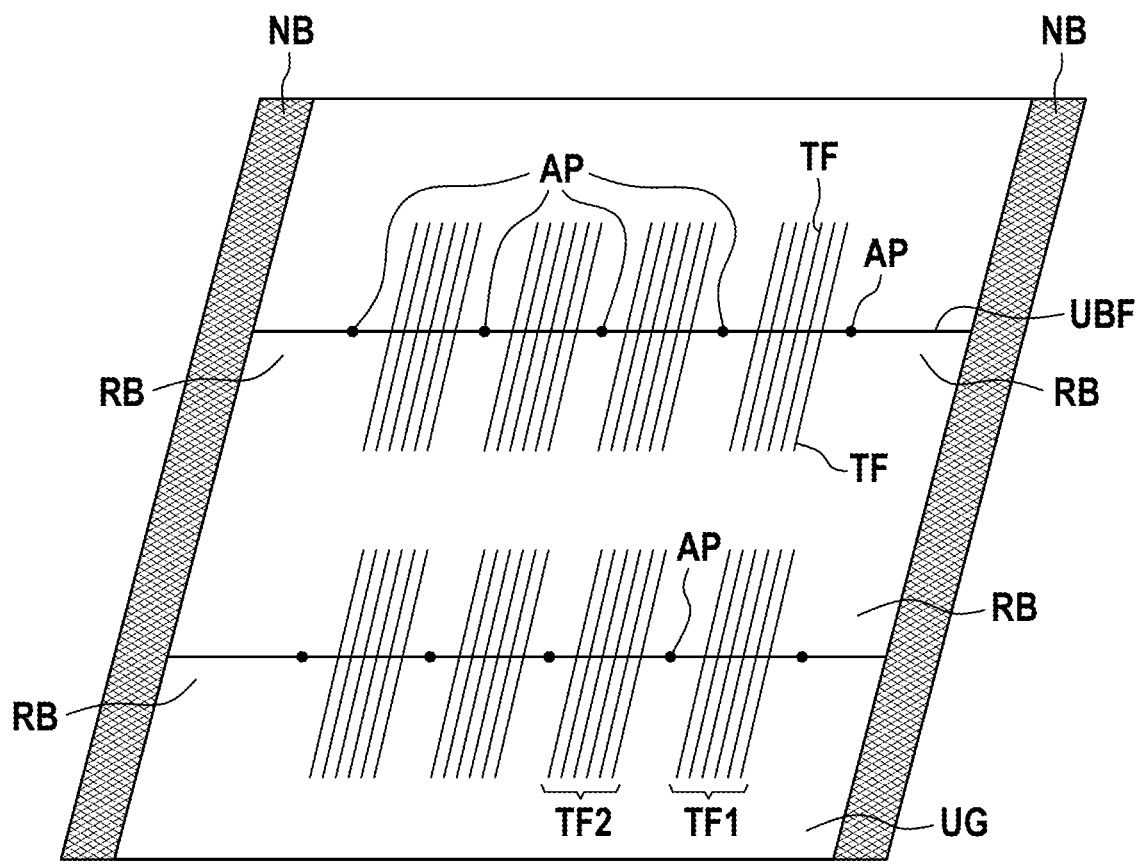
FIG. 1 is a greatly simplified diagrammatic representation of the arrangement of limiting threads in the crossover region of the tether threads of a portion of a lower fabric layer in an airbag according to the invention.

FIG. 1 is an illustration of an exemplary arrangement of limiting threads UBF in the crossover region of tether threads TF of a portion of a lower fabric layer UG in an embodiment of an airbag according to the invention. The upper fabric layer OG is not shown for reasons of clarity. It has to be imagined as placed over the lower fabric layer UG, the lower and upper fabric layer being woven together into a single single-ply fabric layer in the seam region NB. Floating portions of the tether threads TF are shown which are crossed by overlying limiting threads BF. Those regions in which the tether threads are woven into the lower fabric layer UG are not visible in this diagram. In a complete airbag, the ends of the tether threads TF protruding towards the middle of FIG. 1 merge into the upper fabric layer OG (not shown here).

Between the "fields" of tether threads TF, the limiting threads UBF are attached at attachment points AP on the inner surface of the lower fabric layer UG of the airbag.

The limiting threads UBF float between the attachment points AP. In the edge regions RB, the limiting threads UBF are arranged so as to be loosely floating and end in the single-ply seam region NB which they are woven into, for example, in such a manner that they can be pulled out therefrom at a predeterminable tensile force as a result of the inflated airbag, and then release the tether threads TF in the second pressure stage which will be discussed below.

Figure 2:
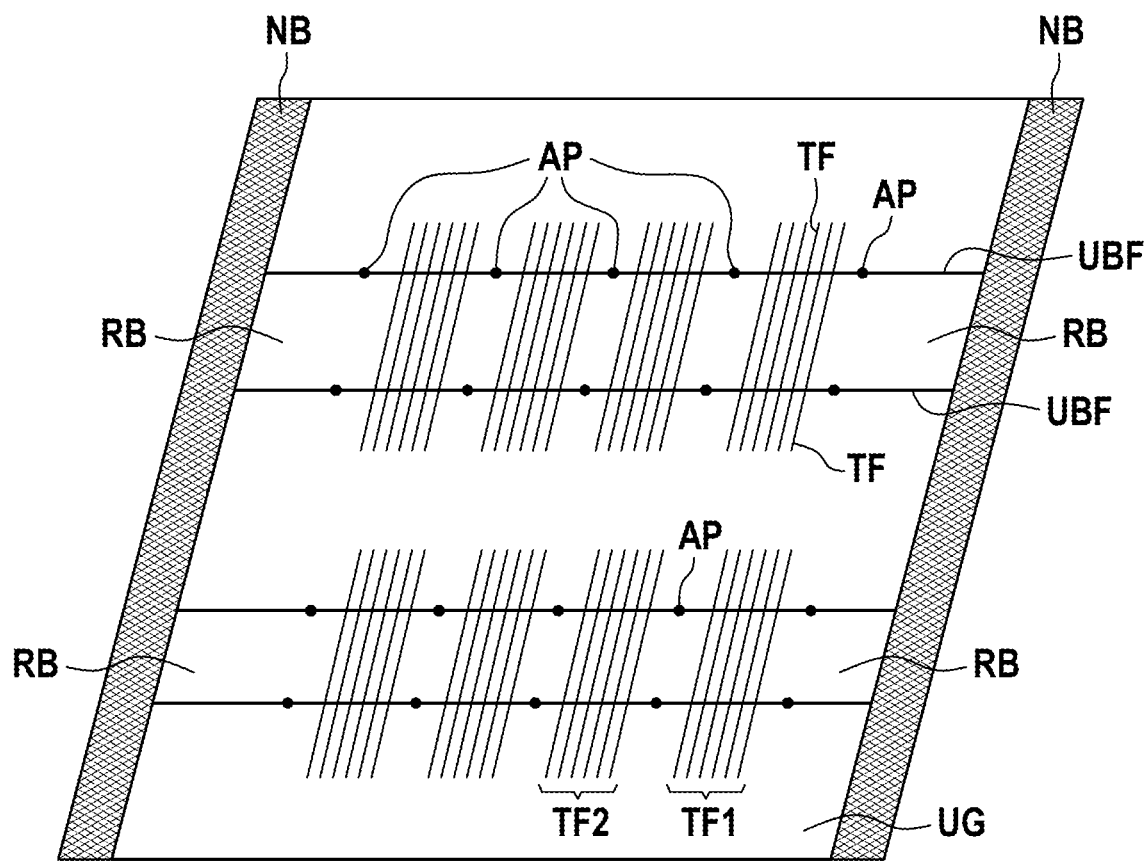
FIG. 2 is a schematic representation of the arrangement of two adjacent limiting threads in the crossover region of the tether threads of a portion of a lower fabric layer in an airbag according to the invention.

FIG. 2 shows a similar configuration to the configuration shown in FIG. 1. The difference consists in the doubling of the limiting threads UBF. Diagrammatic arrangement and purpose are similar to the situation shown in FIG. 1. Two limiting threads UBF increase the effect of the limiting threads.

Figure 3:
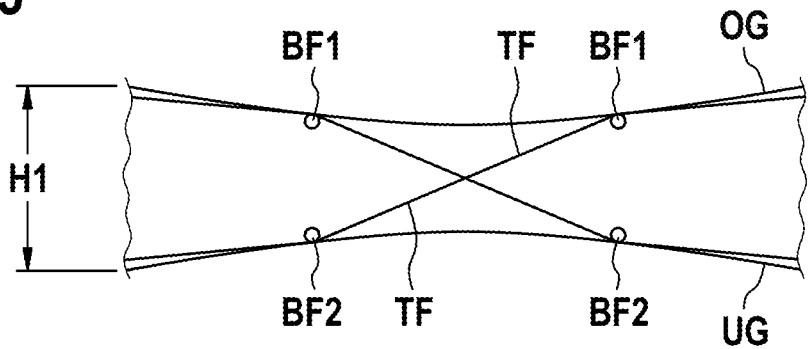
FIG. 3 is a greatly simplified diagrammatic view of an airbag in cross-section (viewed by way of example in the warp direction) in the non-activated. i. e. emptied state.

FIG. 3 finally shows a detail of an embodiment of an airbag according to the invention in section from the side. The upper fabric layer OG and the lower fabric layer UG are visible; they are shown at a distance H1 from each other to show the airbag in the empty (not inflated) state. Tether threads TF lead from the two fabric layers, cross approximately in the middle of FIG. 3 and extend into the opposing fabric layer in which, as it were, they "immerse". Limiting threads BF1 and BF2 "obstruct" a straight-line course of the tether threads TF crossing the fabric layers.

Figure 4:
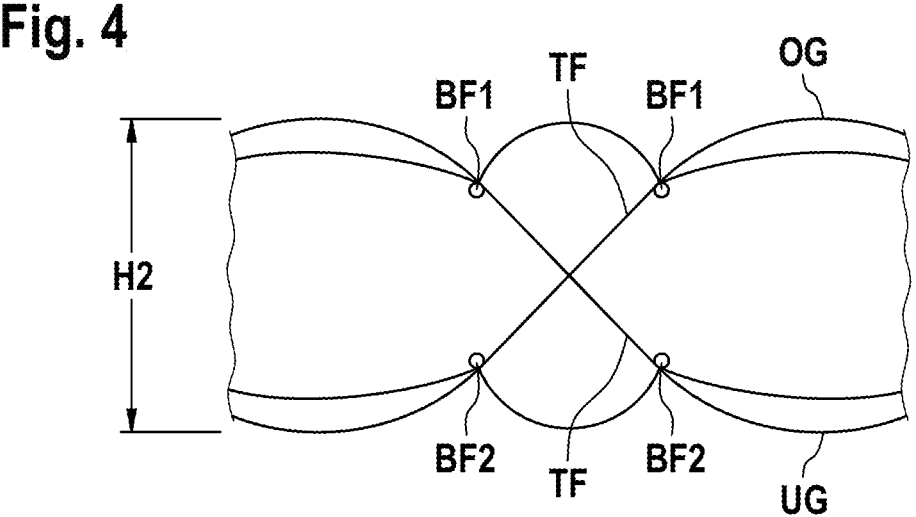
FIG. 4 is a greatly simplified diagrammatic view of the airbag from FIG. 3 in the first pressure stage, in which the limiting threads limit the tether threads.

If now, as shown in FIG. 4, the intermediate space between the two fabric layers UG and OG, that is the inside of the airbag, is filled, for example, with a fluid (air or generally inflation gas) in a first pressure stage (phase 1), the two fabric layers UG and OG are forced apart with the effect that a distance H2 results between them. The tether threads TF can still not extend linearly, as they are still prevented from doing this by the limiting threads BF1 and BF2.

Figure 5:
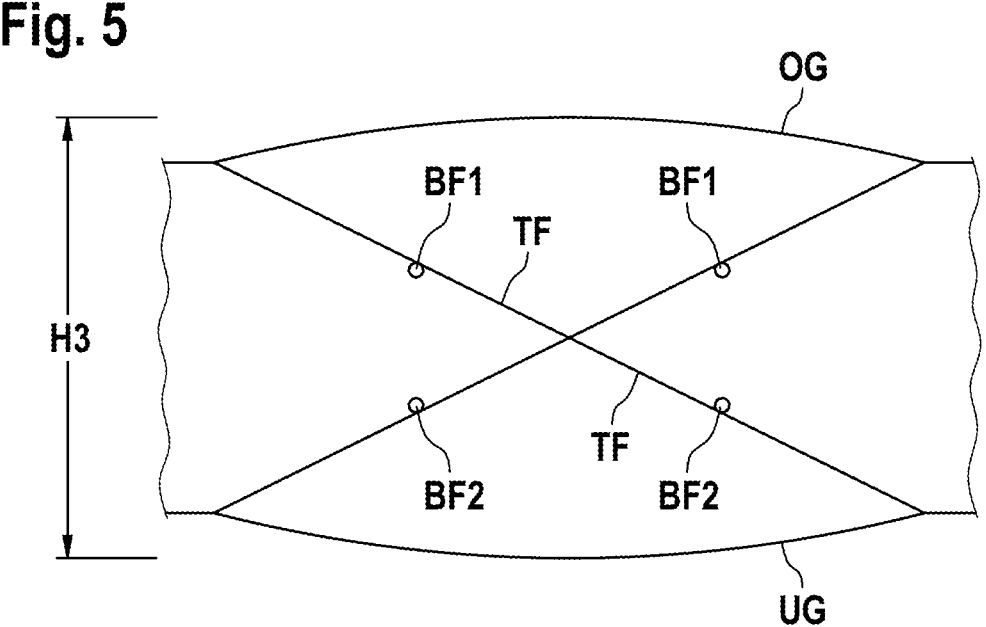
FIG. 5 is a greatly simplified diagrammatic view of the airbag from FIG. 3 in the second pressure stage, in which the limiting threads completely release the tether threads and the airbag can deploy fully into the third dimension.

If, as can be seen in FIG. 5, the pressure in the airbag is increased in a second pressure stage (phase 2), e.g. by supplying additional air, the limiting threads BF1 and BF2 give way to the tethers TF, either by simply breaking off—according to their predetermined strength—or they are pulled out of the upper and/or lower fabric layer in the seam region due to the longitudinal force acting on them. In a third variant, the airbag according to the invention may be designed such that the attachment points AP originally holding the limiting threads tear. In this case too, the limiting threads gain additional "free" length and can no longer prevent the tether threads TF from acting. They now extend linearly and allow the maximum inflation volume of the airbag.

In the right-hand part of FIG. 6a, there is a uniform fabric UG in plain weave in which a limiting thread BFS—coming from the left after crossing with a tether thread TF—is introduced uniformly tightly like its adjacent parallel threads.

In contrast, in the fabric according to the right-hand side of FIG. 6b, a limiting thread BFL—coming from the left after crossing with a tether thread TF—is introduced unevenly in the fabric layer, as loosely woven-in limiting thread BFL which floats in places over a plurality of threads crossing below it, i.e. it lies loosely and is not woven in.

Due, for example, to the different insertion of the limiting threads—the yarns, which form fabric layers UG and OG, are more tightly woven in than the yarns which form the limiting threads—it is possible to achieve a different length of the yarns in an airbag. Due to this difference in length, it is possible to lay these yarns over the tether threads TF such that they restrict the tether threads TF during deployment.

The limiting threads are usually incorporated over the entire width of the air bag. The position of the attachment points and/or the number of limiting threads is defined depending on the inflation height of the airbag to be achieved in the first pressure stage.

The limiting threads are woven in at their attachment points in such a manner that they are only "looped through" and thus a pulling movement remains possible. In the edge region, that is in the single-ply seam region (woven seam) NB, the limiting threads are woven in such that the friction resistance is many times higher compared to the situation in the attachment points. Different friction resistances, which are to be overcome, arise due to the difference in weaving the limiting threads into the base fabric. Due to these forces which are to be applied differently, it is possible in conjunction with the different yarn lengths to inflate the airbag according to the invention in multiple stages.

If the internal pressure increases beyond the first pressure stage (phase 1), the resulting pulling acting on the limiting threads pulls them out of the single-ply seam region of the construction and then releases the remaining path so that the tether threads can deploy freely.

A further variant would consist of selecting lower strength yarns for use as limiting threads. These yarns would then tear above a certain force application and release the tether threads.

The invention claimed is:

1. A one-piece woven airbag for vehicle restraint systems, comprising:
   an upper fabric and a lower fabric which are joined together in a single-ply seam region forming the border of the airbag;
   tether threads which are woven partially into the upper fabric and partially into the lower fabric such that a defined portion of each tether thread floats between the upper fabric and the lower fabric; and
   upper limiting threads which are woven into the upper fabric and/or lower limiting threads which are woven into the lower fabric, wherein the upper and/or lower limiting threads float over a defined number of the tether threads and are fastened to attachment points of their respective upper and/or lower fabric such that the upper and/or lower limiting threads inhibit linear extension of the defined portions of the tether threads.

2. The airbag according to claim 1, wherein the upper and/or lower limiting threads are woven into the upper fabric and/or lower fabric in each case less tightly than threads forming the upper fabric and the lower fabric.

3. The airbag according to claim 1, wherein the upper and/or lower limiting threads have a lower strength than the threads forming the upper fabric and the lower fabric.

4. The airbag according to claim 1, wherein:
   the upper fabric and lower fabric define an intermediate space therebetween,
   the upper and/or lower limiting threads are configured to inhibit linear extension of the defined portions of the tether threads when a pressure of fluid in the intermediate space is in a first pressure range, and
   the upper and/or lower limiting threads are configured to allow linear extension of the defined portions of the tether threads when the pressure of fluid in the intermediate space is greater than the first pressure range.

5. A one-piece woven airbag for vehicle restraint systems, comprising:
   a first fabric and a second fabric which are joined together in a single-ply seam region forming the border of the airbag;
   a tether thread that is woven partially into the first fabric and partially into the second fabric such that a defined portion of the tether thread floats between the first fabric and the second fabric; and
   a limiting thread that is woven into the first fabric and fastened to attachment points of the first fabric such that a floating portion of the limiting thread floats between the attachment points,
   wherein the floating portion of the limiting thread crosses the defined portion of the tether thread with the defined portion located between the floating portion and first fabric, such that the floating portion inhibits linear extension of the defined portion.

6. The airbag according to claim 5, wherein:
   the first fabric and second fabric define an intermediate space therebetween,
   the limiting thread is configured to inhibit linear extension of the defined portion of the tether thread when a pressure of fluid in the intermediate space is in a first pressure range, and the limiting thread is configured to allow linear extension of the defined portion of the tether thread when the pressure of fluid in the intermediate space is greater than the first pressure range.

* * * * *